United States Patent [19]

Kucera et al.

[11] 4,257,903

[45] Mar. 24, 1981

[54] DRILLING FLUID CONTAINING CROSSLINKED POLYSACCHARIDE DERIVATIVE

[75] Inventors: Clare H. Kucera; Donald N. DeMott, both of Tulsa, Okla.

[73] Assignee: The Dow Chemical Company, Midland, Mich.

[21] Appl. No.: 952,875

[22] Filed: Oct. 19, 1978

[51] Int. Cl.$^3$ .............................................. C09K 7/02
[52] U.S. Cl. ................................. 252/8.5 C; 252/316; 536/114; 536/121
[58] Field of Search ............ 252/8.5 A, 8.5 C, 8.55 R, 252/316; 536/88, 114

[56] References Cited

U.S. PATENT DOCUMENTS

| | | | |
|---|---|---|---|
| 3,058,909 | 10/1962 | Kern | 252/8.55 |
| 3,079,332 | 2/1963 | Wyant | 252/8.5 |
| 3,243,000 | 3/1966 | Patton et al. | 252/8.5 X |
| 3,301,723 | 1/1967 | Chrisp | 252/316 X |
| 3,319,715 | 5/1967 | Parks | 252/8.55 |
| 3,483,121 | 12/1969 | Jordan | 252/8.55 |
| 3,629,229 | 12/1971 | Schmank | 252/316 X |
| 3,699,042 | 10/1972 | Browning et al. | 252/8.5 |
| 3,753,971 | 8/1973 | Browning et al. | 260/124 |
| 3,888,312 | 6/1975 | Tiner et al. | 166/308 |
| 3,974,077 | 8/1976 | Free | 252/8.55 |
| 4,024,073 | 5/1977 | Shimizu et al. | 252/316 |
| 4,025,443 | 5/1977 | Jackson | 252/8.5 |

*Primary Examiner*—Herbert B. Guynn
*Attorney, Agent, or Firm*—L. W. White

[57] ABSTRACT

A drilling fluid having extremely desirable physical properties which comprises an aqueous solution of a hydroxyalkyl polysaccharide derivative and a water soluble ionic aluminum crosslinking agent, preferably sodium aluminate.

16 Claims, No Drawings

DRILLING FLUID CONTAINING CROSSLINKED POLYSACCHARIDE DERIVATIVE

TECHNICAL FIELD

This invention relates to drilling fluid compositions utilized in drilling wells. When drilling subterranean wells such as, for example, oil or gas wells, the rotary drilling method is commonly employed. The rotary drilling method utilizes a bit attached to a drill stem, and a drilling fluid or "mud" which is circulated through the drill stem to the bottom of the borehole where it is ejected through small openings in the drill bit. The fluid is then returned to the surface through the annular space between the drill stem and the borehole wall, or casing if one has been installed. Upon reaching the surface, the drilling fluid or "mud" is ordinarily treated to remove cuttings obtained from the borehole, and is then recirculated.

Drilling fluids serve many functions, and should therefore possess a number of desirable physical and rheological properties. For example, the viscosity of a drilling fluid should be sufficient to permit it to effectively transport bit cuttings from the bottom of the borehole to the surface for removal. A drilling fluid should also prevent excessive amounts of fluid from flowing from the borehole into surrounding formations by depositing on the wall of the hole a thin but substantially impervious filter cake. In addition, a drilling fluid should be able to hold solids in suspension, preventing their return to the bottom of the hole when the drilling rate is reduced or drilling is temporarily interrupted. This property can be obtained by utilizing additives which will impart a gel structure to the drilling fluid to increase viscosities. The gel structure, however, is preferably such that cuttings can be removed from the drilling fluid by passing the fluid through filtration equipment such as a shale shaker and/or sand cyclones prior to recirculating the fluid to the drill bit. A drilling fluid must also serve as a weighting agent, exerting pressure on the surrounding formations, thus preventing possible caving of the borehole by highly pressurized oil or gas in the formation. Finally, a drilling fluid should serve as a lubricating agent for the surface of the bit teeth.

BACKGROUND ART

Traditionally, bentonite or other clay solids have been utilized to increase the viscosity of the drilling fluid. Today however, there is a growing belief that bentonite or clay suspensions have serious limitations as a drilling fluid base. Of primary importance is the fact that the rheology of bentonite-based fluids is such that the hydraulic horsepower delivered to the bit at a given surface pressure is significantly less than with drilling fluids of lower viscosity and/or solids content. This results in a slower bit penetration rate which in turn increases the drilling costs. In an effort to overcome these problems, dispersants have been utilized to lower apparent viscosities and gel strengths of clay suspensions.

More recently, those working within the industry have attempted to substitute for the clay solids of the older muds various polymeric materials including, for example: cellulose compounds such as carboxyethyl cellulose, carboxymethyl cellulose, carboxymethyl hydroxyethyl cellulose, hydroxyalkyl celluloses, alkylhydroxyalkyl celluloses, alkyl celluloses, and alkylcarboxyalkyl celluloses; polyacrylamides; natural galactomannans such as guar gum, locust beam gum, and gums derived from endosperm seeds; and various other polysaccharides.

Additionally, those working with drilling fluids containing the polymeric materials have discovered that it is possible to improve their rheological properties by employing them in combination with different crosslinking agents. Wyant, U.S. Pat. No. 3,079,332, discloses the use of borates as crosslinkers for guar gum and locust bean gum employed as a fluid-loss agent in drilling fluid applications. More recently, Patton et al., U.S. Pat. No. 3,243,000, Chrisp, U.S. Pat. No. 3,301,723, Browning et al., U.S. Pat. No. 3,699,042, and Browning et al., U.S. Pat. No. 3,753,971 have disclosed polysaccharides crosslinked with organic polyelectrolyte ligands and polyvalent metal cations. Certain metal compounds are objectionable from a practical standpoint, however. For example, heavy metals such as chromium are potentially somewhat toxic and may also act as a catalyst poison if residues remain in the formation and become entrained in recovered petroleum products. Other metals such as iron can contribute to more rapid corrosion.

In addition to the drilling fluids employed in drilling subterranean wells, it is known throughout the industry that other fluids can also be utilized for certain specialized applications. For example, fracturing fluids, spacing fluids, plugging fluids, cementing fluids, and completion fluids may be utilized in addition to a drilling fluid to achieve a particular result at one stage or another in the drilling operation. It is recognized by those of ordinary skill in the art, however, that compositions exhibiting properties desirable for some specialized application may not perform satisfactorily where employed for another purpose. Jordan, U.S. Pat. No. 3,483,121, and Free, U.S. Pat. No. 3,974,077, disclose the use of hydroxypropyl guar in fracturing fluids; Kern, U.S. Pat. No. 3,058,909, and Free, U.S. Pat. No. 3,974,077, disclose fracturing fluids comprising guar gum crosslinked with borate ions. Borate ions have proven undesirable for crosslinking polysaccharides utilized in drilling fluids. Unlike fracturing fluids, drilling fluids are recirculated through the well many times. Although much of the larger particulate matter, such as bit cuttings and the like, is removed from the drilling fluid after each cycle through the well, the fine solids content of the fluid becomes progressively greater with continued circulation. Where the drilling fluid comprises polysaccharides crosslinked with borates, it has been found that the borate ions tend to flocculate the fine solids suspended in the fluid. This flocculation or "clumping" characteristic reduces the effectiveness of the drilling fluid, and is considered undesirable. Tiner et al., U.S. Pat. No. 3,888,312, disclose fracturing fluids using organotitanate-crosslinked hydroxyalkyl polysaccharide derivatives.

Therefore, notwithstanding the advances made in drilling fluid technology in recent years, there remains a need for a fluid that will significantly improve bit penetration (and hence the drilling rate), will remain shear stable even after being recirculated through the borehole many times, will reduce the pressure losses due to friction in the drill pipe, will promote better lifting and therefore less grinding of cuttings at the bottom of the borehole, will better lubricate the bit during cutting (thereby increasing bit life), will improve borehole stability, will better lubricate the borehole so as to diminish the chances of hang-ups during "tripping" of the drill pipe, will maintain borehole cuttings in a suspended state during drilling interruptions, and will not flocculate the fine solids suspended in the drilling fluid.

DISCLOSURE OF INVENTION

This invention may be generally described as an improved drilling fluid comprising an aqueous solution of a hydroxyalkyl polysaccharide derivative crosslinked with a water soluble ionic aluminum compound. A most preferred ionic aluminum crosslinking agent for use with the present invention is sodium aluminate. Preferably, the unweighted drilling fluid comprises from about 0.05 to about 2.5 lbs. polymer per barrel of fluid (0.14–7.13 kg/m$^3$), and from about 0.17 to about 11.5 lbs. crosslinker, calculated as sodium aluminate, per barrel (0.49–32.81 kg/m$^3$). Most preferably, the unweighted drilling fluid comprises from about 0.5 to about 1.5 lbs. polymer per barrel (1.43–4.28 kg/m$^3$), and from about 1.5 to about 3.5 lbs. crosslinker per barrel (4.28–9.99 kg/m$^3$). The subject drilling fluid is made by admixing the hydroxyalkyl polysaccharide derivative with water, circulating the admixture thus formed for a period effective to permit hydration of the polymer, and thereafter adding the ionic aluminum crosslinking agent. An improved method for drilling subterranean wells through use of the novel drilling fluid of the invention is also provided.

DETAILED DESCRIPTION

The present invention utilizes aluminum compounds which are sufficiently soluble in water so that an effective amount of the compound can be dissolved in the water to crosslink the hydroxyalkyl polysaccharide derivative. Preferably, alkali metal aluminates, and most preferably sodium aluminate, are employed as the ionic aluminum crosslinking agent for the hydroxyalkyl polysaccharide derivatives in the drilling fluids of the present invention. Mixtures of aluminum compounds can also be employed if desired. Preferably, the hydroxyalkyl substituent is hydroxypropyl. The polysaccharide derivative is preferably derived from a galactomannan gum, and most preferably guar gum. The derivatives disclosed by Jordan, U.S. Pat. No. 3,483,121, are suitable for use herein. The novel composition disclosed herein will exhibit extremely desirable physical and rheological properties, including improved lubricity and flow characteristics as well as increased shear stability over a prolonged period of use. This improved shear stability is believed to be attributable to the strong ionic bonds formed when alkali metal aluminates, and preferably sodium aluminate, are employed as the crosslinking agents.

The drilling fluid of the subject invention is preferably made at the use site by slowly adding a powdered hydroxyalkyl polysaccharide derivative such as hydroxypropyl guar to water circulating through conventional blending equipment such as a jet hopper, and into the mud pit. The water employed is preferably as fresh as is reasonably obtainable, although brines may also be employed and may be preferable where shale sloughing or formations with a high clay content are expected to be encountered. This versatility is another advantage of the drilling fluid of the present invention. When all the polymer has been added, the fluid is circulated until hydration of the hydroxyalkyl polysaccharide derivative is substantially complete. An effective amount of a suitable buffer may be added if desired to promote hydration, as will be understood by those skilled in the art. After hydration is substantially complete, the ionic aluminum crosslinking agent is slowly added thereto, preferably as an aqueous solution, and the combined fluid is circulated for an additional period of time effective to achieve crosslinking of the hydroxyalkyl polysaccharide derivative. The crosslinking agent should be present in an amount sufficient to provide a polymer:aluminum weight ratio of from about 1:0.05 to about 1:2.2, preferably about 1:0.37 to about 1:0.77, and the balance water.

The unweighted drilling fluid thus formed preferably comprises from about 0.05 to about 2.5 lbs. polymer per barrel of fluid (0.14–7.13 kg/m$^3$), and from about 0.17 to about 11.5 lbs. crosslinker, calculated as sodium aluminate, per barrel (0.49–32.81 kg/m$^3$). Most preferably, the unweighted drilling fluid comprises from about 0.5 to about 1.5 lbs. polymer per barrel (1.43–4.28 kg/m$^3$), and from about 1.5 to about 3.5 lbs. crosslinking agent (4.28–9.99 kg/m$^3$). If desired, the viscosity of the drilling fluid may be increased at a point in time subsequent to the initial preparation of the drilling fluid by gradual addition of more polymer and/or crosslinker.

The most preferred hydroxypropyl polysaccharide derivative of the invention, hydroxypropyl guar, has the following generalized molecular structure:

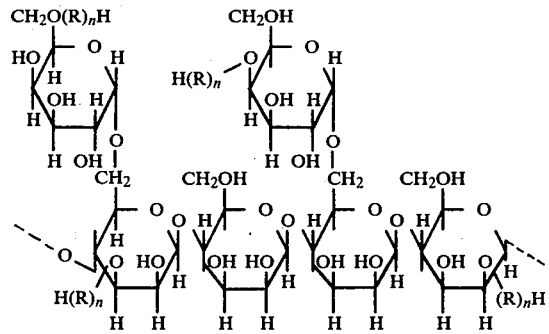

wherein $R + CH_2CH(CH_3)O$, although it is understood that both the degree of substitution and the position of the derivative groups may vary within the scope of the invention from that shown above. The molecular substitution of the hydroxypropyl polysaccharide derivative will preferably range from about 0.35 to about 0.50 percent. A satisfactory hydroxypropyl polysaccharide derivative for use with the present invention is a hydroxypropyl guar gum derivative (galactomannan ether) marketed under the trademark Jaguar HP-8 by Stein, Hall and Co. Inc., 605 3rd Avenue, New York, New York. Jaguar HP-8 disperses readily into water, hydrates slowly to form a solution, and will eventually gel if left at its inherent alkaline pH. However, if an acid diluent is added immediately after initial dispersion to reduce the pH to neutral or slightly acidic conditions, the product will hydrate in about 15 minutes to a high viscosity solution having a smooth appearance. Jaguar HP-11, a hydroxypropyl guar gum derivative with the same generalized molecular structure as HP-8, but with an added buffer salt, is capable of achieving complete hydration within about eight minutes, and can also be used within the scope of the invention.

The ionic aluminum crosslinking agent of the invention is preferably selected from the group consisting of the alkali metal aluminates, and the most preferred alkali metal aluminate for use with the present invention is sodium aluminate. Other soluble aluminate compounds can also be employed, however. For example, ammonium aluminum sulfate can be employed as a crosslinker, with the pH adjusted with a suitable base to obtain optimum crosslinking. Sodium aluminate is a water soluble white powder that is strongly alkaline in aqueous solution. While the reason for the significantly enhanced shear stability achievable through use of sodium aluminate as a crosslinking agent is not precisely known, it is believed to result from the strong ionic bonds formed when the dissociated aluminate ions are combined with the hydrated hydroxyalkyl polysaccharide derivative.

According to a preferred embodiment of the invention, the density of the subject drilling fluid ranges from about 8.34 to about 20 lbs. per gallon (1.0–2.4 g/ml), or greater, depending upon whether or not an additional weighting agent such as barite is combined therewith. The Fann viscosity of the drilling fluid preferably ranges from about 5 to about 60 centipoises at 300 rpm at ambient temperature, and the pH preferably ranges from about 8 to about 11, depending upon the formation, formation water pH, optimum crosslinking pH for the particular combination of polymer and crosslinker employed, and the like. Furthermore, the preferred drilling fluid of the invention remains shear stable at static temperatures ranging up to about 180° F. (82° C.) and circulating temperatures ranging up to about 250° F. (121° C.).

The significantly improved results that can be obtained through use of the novel drilling fluid disclosed herein are further illustrated by reference to the following examples:

EXAMPLE I

Comparative drilling rates for the various drilling fluid compositions listed in Tables I through VII below were determined by measuring the penetration rate of a six inch tricone medium hard rock bit into Bedford limestone and Berea sandstone blocks. A constant 50 rpm and 10,000 psi bit weight were used throughout the tests. Drilling fluids were circulated through 30 feet of drill pipe and through the bit at different flow rates. Drill solids were removed by flowing the drilling fluid over a shale shaker fitted with a 200 mesh sieve screen.

The six inch drill bit was fitted with three 9/32 inch nozzles, and the pressure drop across the bit nozzles was measured at different flow rates. Two flow rates were selected for each drilling fluid such that the bit hydraulic horsepower per square inch of bit surface was either 1 or 2 HHP/in² as calculated from the equation:

$$HHP_{Bit}/in^2 = \frac{P \times Q}{1714} \times \frac{1}{\frac{(3.14)D^2}{4}}$$

where
P = pressure, psi
Q = flow rate, gallons per minute
D = bit diameter, inches The penetration rate of the drill bit into the blocks was measured in feet per hour at 1 HHP/in² and at 2 HHP/in². The change in drilling rate as a function of hydraulic horsepower is the difference between the penetration rate at each horsepower level, as shown in Tables I and II.

TABLE I

Effect of Hydraulic Horsepower Change on Drilling Rate

| Drilling Fluid % Composition | Drilling Rate - Limestone - Ft/Hr | | Change in Drilling Rate per Change in HHP/in² |
|---|---|---|---|
| | 1 HHP/in² | 2 HHP/in² | |
| 1.0 PSD Polymer | 72.2 | 75.0 | 3.0 |
| 1.68 PSD Polymer | 62.4 | 67.5 | 5.4 |
| 3.0 Bentonite | 73.3 | 76.6 | 3.3 |
| Low Solids Mud | 73.1 | 83.5 | 10.4 |
| Fresh Water | 84.12 | 98.4 | 14.3 |

TABLE II

Effect of Hydraulic Horsepower Change on Drilling Rate

| Drilling Fluid % Composition | Drilling Rate - Sandstone - Ft/Hr | | Change in Drilling Rate per Change in HHP/in² |
|---|---|---|---|
| | 1 HHP/in² | 2 HHP/in² | |
| 1.0 PSD Polymer | 35.2 | 37.5 | 2.3 |
| 1.68 PSD Polymer | 33.1 | 34.3 | 1.2 |
| 3.0 Bentonite | 41.7 | 45.0 | 3.3 |
| Low Solids Mud | 45.2 | 47.7 | 2.5 |
| Fresh Water | 50.8 | 57.0 | 6.2 |

In the tables, "1.68 PSD Polymer" refers to a drilling fluid containing 1% polysaccharide derivative, by weight of water. To prepare the fluid, an aqueous solution of 38 weight percent sodium aluminate was prepared. To 50 barrels (7.95 m³) of water was added about 300 lbs. (136.08 kg) of hydroxypropyl guar gum. After circulating the polymer until it hydrated, 25 gallons (0.095 m³) of the 38% sodium aluminate solution was added to crosslink the polymer. The polymer:crosslinker ratio was the same for the 1% PSD fluid. The "Low Solids Mud" contained less than 3 weight percent bentonite, but contained about 0.05 weight percent BenEx brand bentonite extender. The penetration rates shown in Tables I and II depend upon the hydraulic horsepower available at the drill bit. The bit hydraulic horsepower, in turn, depends upon the flow rate Q, and the pressure P, available at the drill bit. Frictional pressure losses occur when fluids are pumped down the drill pipe, and this results in varying levels of hydraulic horsepower being expended at the drill bit. These hydraulic horsepower losses can be determined by first calculating the drill pipe pressure losses from the Fann rheometer readings, using the method outlined in API Bulletin 13D, May, 1977. The pressure losses and bit hydraulic horsepower losses are summarized in Table III.

TABLE III

Bit HHP Losses Due to Pressure Loss in Drill String

| Drilling Fluid % Composition | Fann Readings | | Pressure Loss in Drill Pipe PSI/1000 Ft | Bit HHP Loss HHP/in²/ 1000 Ft |
|---|---|---|---|---|
| | 600 RPM | 300 RPM | | |
| 1.0 PSD Polymer | 8.4 | 4.8 | 154.9 | 0.64 |
| 1.68 PSD Polymer | 27.8 | 19.4 | 203.4 | 0.84 |
| 3.0 Bentonite | 27.4 | 17.2 | 205.9 | 0.85 |
| Low Solids Mud | 11.0 | 7.2 | 168.7 | 0.70 |
| Fresh Water | 3.0 | 1.5 | 128.6 | 0.53 |

Tables IV and V list the change in penetration rate for the drilling fluid of this invention and for several other commonly used drilling muds. It should be noted that the decrease in penetration rate is much less for the subject drilling fluid than for either the conventional drilling muds or fresh water.

TABLE IV

Limestone

| Drilling Fluid % Composition | Bit HHP Loss HHP/ in$^2$/1000 Ft | Drilling Rate Change Per HHP/in$^2$ - Ft/ Hr/HHP/in$^2$ | Drilling Rate Change Ft/Hr/1000 Ft |
|---|---|---|---|
| 1.0 PSD Polymer | 0.64 | 3.0 | 1.92 |
| 1.68 PSD Polymer | 0.84 | 5.4 | 4.54 |
| 3.0 Bentonite | 0.85 | 3.3 | 2.81 |
| Low Solids Mud | 0.70 | 10.4 | 7.28 |
| Fresh Water | 0.53 | 14.3 | 7.58 |

TABLE V

Sandstone

| Drilling Fluid % Composition | Bit HHP Loss HHP/ in$^2$/1000 Ft | Drilling Rate Change Per HHP/in$^2$ - Ft/ Hr/HHP/in$^2$ | Drilling Rate Change Ft/Hr/1000 Ft |
|---|---|---|---|
| 1.0 PSD Polymer | 0.64 | 2.3 | 1.47 |
| 1.68 PSD Polymer | 0.84 | 1.2 | 1.01 |
| 3.0 Bentonite | 0.85 | 3.3 | 2.81 |
| Low Solids Mud | 0.70 | 2.5 | 1.75 |
| Fresh Water | 0.53 | 6.2 | 3.29 |

Tables VI and VII show how the drilling rate changes with depth as a result of the increased pressure loss due to friction in the drill pipe. Laboratory data, however, cannot demonstrate many of the advantages of the present invention such as cuttings removal efficiency, bit life, borehole stability, drill stem friction effects, and the like.

TABLE VI

Limestone

| Drilling Fluid % Composition | Initial Drilling Rate Ft/Hr | Drilling Rate Change Per HHP/in$^2$-Ft/Hr/ 1000 Ft |
|---|---|---|
| 1.0 PSD Polymer | 75 | 1.92 |
| 1.68 PSD Polymer | 67.5 | 4.54 |
| 3.0 Bentonite | 76.6 | 2.81 |
| Low Solids Mud | 83.5 | 7.28 |
| Fresh Water | 98.4 | 7.58 |

| Drilling Fluid % Composition | Drilling Rate at Depth | | | |
|---|---|---|---|---|
| | 1000 ft | 3000 ft | 5000 ft | 7000 ft |
| 1.0 PSD Polymer | 73.08 | 69.24 | 65.4 | 61.5 |
| 1.68 PSD Polymer | 62.96 | 53.88 | 44.8 | 35.7 |
| 3.0 Bentonite | 73.79 | 68.17 | 62.55 | 56.9 |
| Low Solids Mud | 76.22 | 61.66 | 47.1 | 32.5 |
| Fresh Water | 90.82 | 75.66 | 60.5 | 45.3 |

TABLE VII

Sandstone

| Drilling Fluid % Composition | Initial Drilling Rate Ft/Hr | Drilling Rate Change Per HHP/in$^2$-Ft/Hr/ 1000 Ft |
|---|---|---|
| 1.0 PSD Polymer | 37.5 | 1.47 |
| 1.68 PSD Polymer | 34.3 | 1.01 |
| 3.0 Bentonite | 45.0 | 2.81 |
| Low Solids Mud | 47.7 | 1.75 |
| Fresh Water | 57.0 | 3.29 |

| Drilling Fluid % Composition | Drilling Rate at Depth | | | |
|---|---|---|---|---|
| | 1000 ft | 3000 ft | 5000 ft | 7000 ft |
| 1.0 PSD Polymer | 36.03 | 33.09 | 30.15 | 27.21 |
| 1.68 PSD Polymer | 33.29 | 31.27 | 29.25 | 27.23 |
| 3.0 Bentonite | 42.19 | 36.57 | 30.95 | 25.33 |
| Low Solids Mud | 45.95 | 42.45 | 38.95 | 35.45 |

TABLE VII-continued

| Fresh Water | 53.71 | 47.13 | 40.55 | 33.97 |
|---|---|---|---|---|

Looking at the data tabulated in Tables I through VII, it is apparent that for the Bedford limestone, the smallest drilling rate change (per HHP/in$^2$-Ft/Hr/1000 Ft) was achieved with the drilling fluid comprising about 1.0 percent of the hydroxypropyl polysaccharide derivative polymer crosslinked through the addition of sodium aluminate. Similarly, with the Berea sandstone, the lowest drilling rate change (per HHP/in$^2$ Ft/Hr/1000 Ft) was achieved with the drilling fluid comprising about 1.68 percent by weight of the hydroxypropyl polysaccharide derivative polymer crosslinked through the addition of sodium aluminate. Therefore, it is seen that the decrease in penetration rate was much less for the subject drilling fluid than for other commonly used conventional drilling muds or fresh water.

EXAMPLE II

In order to demonstrate the increased bit life achievable through use of the drilling fluid disclosed herein, comparative tests were done on two wells located about 220 yards apart drilled near Asherton, Texas. In drilling the first well, conventional bentonite drilling mud was used. A drilling mud according to the present invention was used to drill portions of the second well when drilling was resumed after the surface casing was set. To prepare the fluid, 232 barrels of water were gelled using five 50 pound sacks containing 96 weight percent hydroxypropyl guar, 3.5 weight percent monobasic sodium phosphate, and 0.5 weight percent silica gel, together with 2.5 gallons of liquid sodium aluminate (38%). Shortly after drilling started, another 50 pound sack of the hydroxypropyl guar mixture was added to make up for the approximately 30 barrels of water in the hole. Drilling proceeded at an excellent pace. Over the interval of 535 feet to 2,410 feet, the well logs showed an improved instantaneous drilling rate in the second well that was about 20% greater than the instantaneous drilling rate achieved over the same interval in the first well by using the conventional drilling mud. Furthermore, the bit life (measured in drill footage per bit) ranged from about 17 to about 21% greater in the second well than in the first. This significant increase in bit life is believed to be attributable to better lubrication of the bit, and more effective removal of cuttings away from the bit face, thereby minimizing grinding of the cuttings and the wear on the bit teeth. Furthermore, absolutely no difficulty was encountered in removing the drill stem to change bits and in returning the drill stem to the hole, which indicated the resulting borehole was relatively slick.

While the description of the drilling fluid of the subject invention set forth above has primarily focused on the hydroxyalkyl polysaccharide derivative and ionic aluminum crosslinking agent components thereof, it is understood that other components can also be included within the scope of the invention. Additional components which might be desirable for use in particular situations can include, for example, weighting agents, antifoamants, viscosity modifiers such as plastic beads, fluid loss additives, lost circulation additives, biocides, and the like.

It is therefore seen that through the manufacture and use of the drilling fluid disclosed herein, those working in the drilling industry are now provided with a drilling fluid which significantly reduces pressure loss in the drill string, thereby increasing the bit penetration rate; which improves lubricity, reduces regrinding of cuttings, and significantly prolongs bit life; and which exhibits unexpected improvements in lubricating and stabilizing the borehole. As will be apparent to those of ordinary skill in the art upon reading the present disclosure, many alterations, substitutions, and equivalents may be applicable to the various disclosed embodiments of the invention. It is the intent, however, that the concepts disclosed herein be limited only by the appended claims.

We claim:

1. An improved drilling fluid comprising an aqueous solution of a gelling amount of a hydroxyalkyl galactomannan crosslinked with a water soluble alkali metal aluminate.

2. The improved drilling fluid of claim 1 wherein said hydroxyalkyl galactomannan is present in an amount ranging from about 0.05 to about 2.5 pounds per barrel, of unweighted drilling fluid, and wherein said water soluble alkali metal aluminate is present in an amount ranging from about 0.17 to about 11.5 pounds per barrel.

3. The improved drilling fluid of claim 2 wherein said hydroxyalkyl galactomannan is present in an amount ranging from about 0.5 to about 1.5 pounds per barrel and wherein said water soluble alkali metal aluminate is present in an amount ranging from about 1.5 to about 3.5 pounds per barrel.

4. The improved drilling fluid of claim 1 wherein said hydroxyalkyl galactomannan is a hydroxypropyl galactomannan.

5. The improved drilling fluid of claim 4 wherein said hydroxyalkyl galactomannan is hydroxypropyl guar.

6. The improved drilling fluid of claim 1 wherein said hydroxyalkyl galactomannan has the following generalized molecular structure:

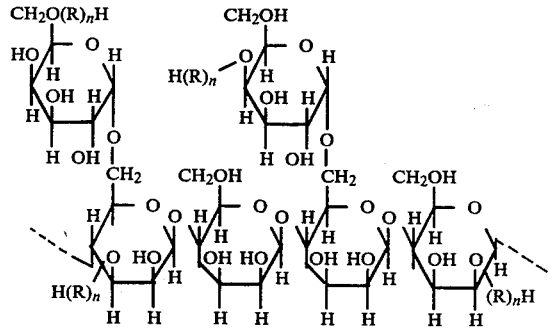

wherein $R = CH_2CH(CH_3)O$, and the molecular substitution of said hydroxyalkyl galactomannan ranges from about 0.35 to about 0.50%.

7. The improved drilling fluid of claim 1, 2, 3, 4, 5 or 6 wherein said water soluble alkali metal aluminate is sodium aluminate.

8. In a rotary drilling process for drilling a borehole into the earth utilizing a rotating drill bit, wherein a drilling fluid is circulated past the surface of the drill bit and thence to the earth's surface, the improvement which comprises employing as the drilling fluid the composition defined by claim 1.

9. The process of claim 8 wherein said hydroxyalkyl galactomannan is present in an amount ranging from about 0.05 to about 2.5 pounds per barrel of drilling fluid, and wherein said alkali metal aluminate is present in an amount ranging from about 0.17 to about 11.5 pounds per barrel.

10. The process of claim 9 wherein said hydroxyalkyl galactomannan is present in an amount ranging from about 0.5 to about 1.5 pounds per barrel, and wherein said alkali metal aluminate is present in an amount ranging from about 1.5 to about 3.5 pounds per barrel.

11. The process of claim 8 wherein said hydroxyalkyl galactomannan is a hydroxypropyl galactomannan.

12. The process of claim 11 wherein said hydroxyalkyl galactomannan is hydroxypropyl guar.

13. The process of claim 8 wherein said hydroxyalkyl galactomannan has the following generalized molecular structure:

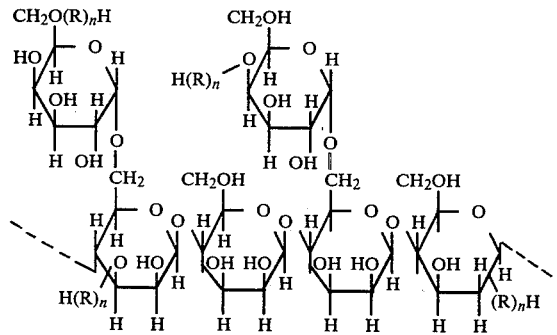

wherein $R = CH_2CH(CH_3)O$, and the molecular substitution of said hydroxyalkyl galactomannan ranges from about 0.35 to about 0.50%.

14. The process of claim 8, 9, 10, 11, 12, or 13 wherein said alkali metal aluminate is sodium aluminate.

15. An improved drilling fluid comprising an aqueous solution of a gelling amount of a hydroxypropyl galactomannan crosslinked with a water soluble ionic aluminum compound wherein said hydroxypropyl galactomannan is present in an amount ranging from about 0.05 to about 2.5 pounds per barrel of unweighted drilling fluid, and wherein said water soluble ionic aluminum compound is an alkali metal aluminate which is present in an amount ranging from about 0.17 to about 11.5 pounds per barrel of unweighted drilling fluid.

16. The improved drilling fluid of claim 15 wherein said hydroxypropyl galactomannan is hydroxypropyl guar which is present in an amount ranging from about 0.15 to about 1.5 pounds per barrel, and wherein said ionic aluminum compound is sodium aluminate which is present in an amount ranging from about 1.5 to about 3.5 pounds per barrel.

* * * * *